Feb. 21, 1956 J. GREAVES 2,735,349
DISK SEEDER ATTACHMENT
Filed June 19, 1953 2 Sheets-Sheet 1

INVENTOR.
Joseph Greaves
BY
George A. Tew
Attorney

Feb. 21, 1956

J. GREAVES 2,735,349

DISK SEEDER ATTACHMENT

Filed June 19, 1953

INVENTOR.
Joseph Greaves
BY
George A. Tew
Attorney

United States Patent Office 2,735,349
Patented Feb. 21, 1956

2,735,349

DISK SEEDER ATTACHMENT

Joseph Greaves, Toston, Mont.

Application June 19, 1953, Serial No. 362,779

5 Claims. (Cl. 97—55)

This invention relates to an attachment for grain drills. The invention is more particularly concerned with an attachment for grain drills including furrow opening disks and grain depositing shoes for successive elevation of the disks and shoes to ground level with resulting spaced dams in the furrows for a purpose later to appear.

Of recent years much attention has been directed to the conservation of moisture and the elimination of erosion and means have heretofore been proposed for a solution to both.

For example, a need for some such solution was recognized by T. D. Campbell to whom Patent No. 2,155,891 was issued April 25, 1939. This patent relates to a furrow dammer and while it may substantially fulfill the requirements so far as the provision of dams is concerned, he fails to recognize the importance of allowing mulch and weeds to remain on the ground which prevents soil blowing and erosion.

The referred to need for moisture conservation and erosion elimination was further recognized by the present applicant as is evidenced by his pending application Serial No. 334,944, filed February 3, 1953, now Patent No. 2,704,970. The referred to application relates to a dam forming furrow opening disk for seeders and wherein the disk is provided with a deep recess opening through its periphery and by which a dam is provided upon each rotation of the disk. The structure according to said application requires a specific form of disk for solving the problem above referred to but does nevertheless provide for the retention of mulch and weeds on the ground.

It is a primary object of this invention to provide an attachment for a multiple disk grain drill which is applicable to existing drills for providing spaced dams in the furrows provided by the disks while retaining the mulch and weeds on the ground.

A further object of the invention is to provide an attachment for existing multiple disk grain drills whereby the several disks are consecutively elevated from their furrow providing positions to substantially ground level for relatively short periods for providing spaced dams in the furrows, and with the dams in the different furrows being staggered transversely of the furrows.

A still further object of the invention is to provide an attachment for the above noted purpose which is capable of being manually thrown into or out of operation and which when in operation is wholly automatic upon propulsion of the drill over the ground.

Other objects and advantages of the invention will become apparent in the course of the following detailed description, taken in connection with the accompanying drawings, wherein—

Figure 1:
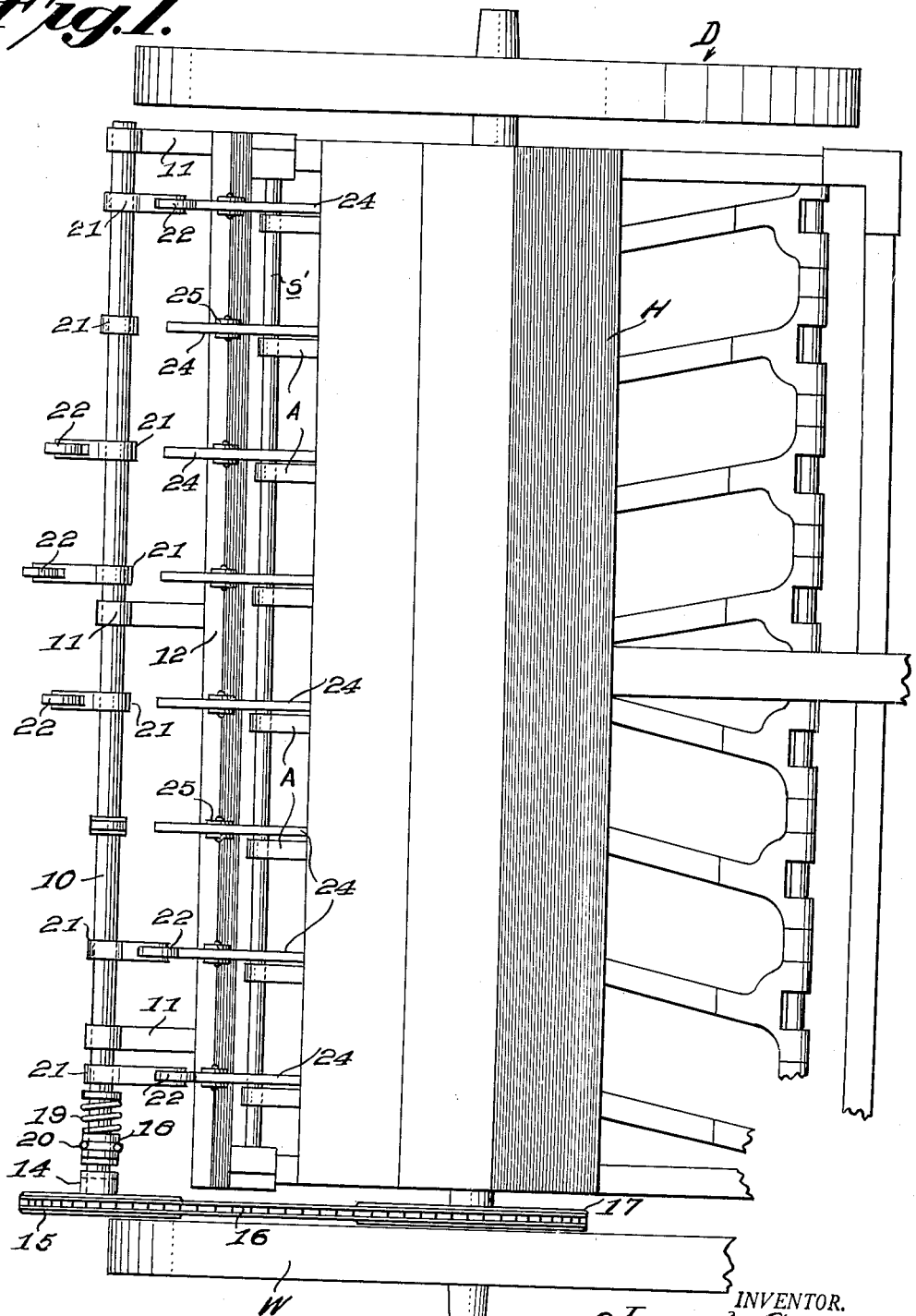
Fig. 1 is a broken top plan view of a grain drill showing the application of the invention thereto.
Figure 2:
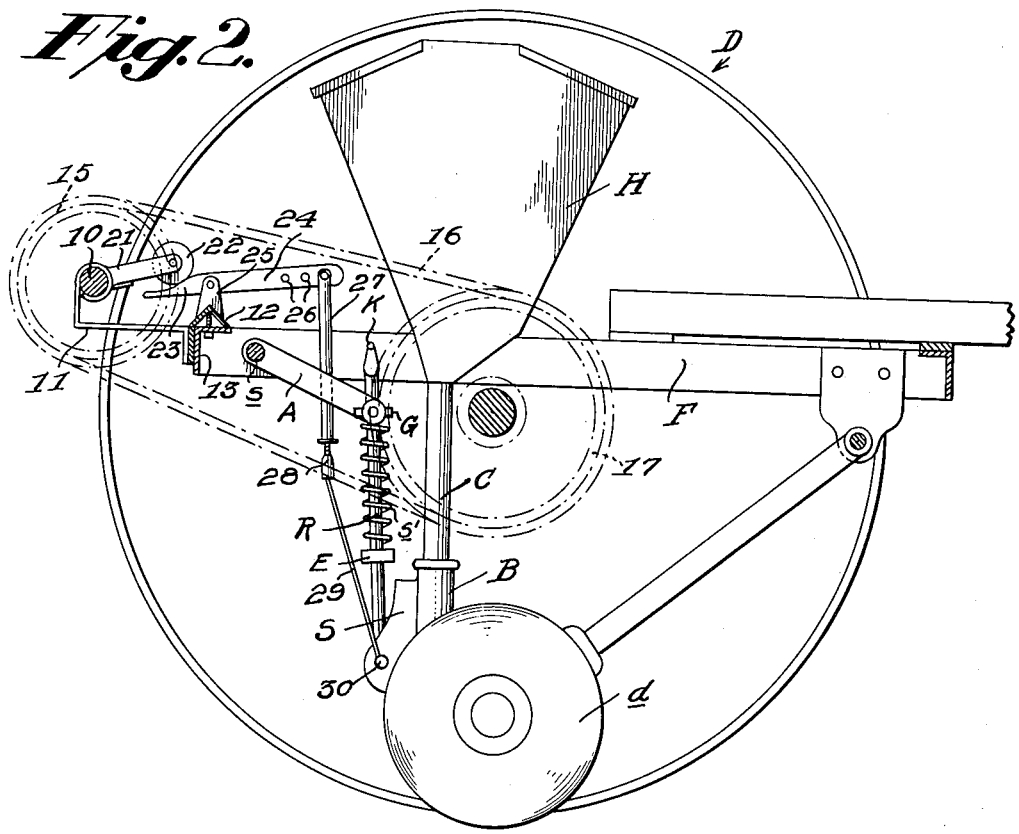
Fig. 2 is a transverse sectional view with the spokes of the far wheel omitted for purpose of clarity and only so much of the drill being shown as is necessary for an understanding of the improved attachment forming the present invention. In this view the sprockets and chain which are operative from the omitted near wheel are shown in dotted lines.

Referring now in detail to the drawing, D designates a grain drill which is of the general form of construction as disclosed in Patent No. 871,770 of November 26, 1907, but which may be of any multiple disk form in use.

The drill includes a seed hopper H disposed above a frame F, a plurality of laterally aligned furrow forming disks d each of which is associated with a shoe S having a boot B into which the seed conductor C projects. As in common practice each shoe S is provided with a lifting rod R whose upper end is provided with laterally projecting knobs K. The rod R passes through a guide G pivotally supported by the adjacent end of an arm A whose opposite end is secured to a shaft s for rotation therewith.

Suitable means are provided as is well known for manual rotation of the shaft s whereupon the guides G engage the knobs K with a resulting simultaneous lifting of all of the disks and shoes.

Springs $s^1$ encircle the rods R and have their opposite ends engaged with guides G and enlargements E on rods R which yieldably urge the disks and shoes into soil penetrating position but which also permit the disks and shoes to individually elevate against the action of the springs.

The attachment forming the subject matter of the present invention comprises a shaft 10 which is supported by brackets 11 projecting rearwardly from an angle bar 12 which is suitably secured to the top face of the rear angle bar 13 of the drill frame F.

The shaft 10 has one end thereof rotatably disposed within a clutch member 14 projecting axially from a sprocket wheel 15 which is driven by a sprocket chain 16 operatively engaged with a second sprocket wheel 17 secured to a wheel W of the drill or to the main drill shaft.

The clutch further includes a second clutch member 18 having axial movement only on shaft 10 and which is backed by a spring 19 for urging the clutch members 14 and 18 into driving relation, suitable clutch releasing means 20 being provided.

A plurality of arms 21 corresponding to the number of disks and shoes are secured to shaft 10 and are disposed in equal angular relation circumferentially of the shaft.

Since in the drill disclosed, there are eight disks and shoes, the arms 21 will be in 45° angular relationship from one end of shaft 10 to the other. The arms 21 are each provided with a roller 22 which is engageable with the tongue 23 forming the shorter end of a lever 24 which is pivoted to ears 25 projecting upwardly from the angle bar 12.

The inner end of the lever 24 is provided with a plurality of apertures 26 for adjustable connection of one end of an internally threaded member 27 and into whose opposite end is adjustably threaded a cable clamping member 28 in which is secured one end of a cable 29 and whose opposite end is secured to the respective shoe S as indicated at 30.

Having described a preferred structure for the purpose set forth, the operation is as follows:

Upon movement of the drill and consequent rotation of the sprocket wheel 17, through the ground wheel or shaft of the drill, rotation will be imparted to the shaft 10 through the sprocket chain 16 and sprocket wheel 15 when same is in normal clutching engagement with the shaft 10.

Upon rotation of the shaft 10, the arms 21 will be rotated and will consecutively engage the tongue ends 23 of the respective levers and upon anti-clockwise rotation of the levers the respective disks and shoes will be momentarily elevated by means of the respective cables 29. The springs $s^1$ will instantly return the disks and shoes to furrow position upon the rollers 22 leaving the tongues 23.

Figure 3:
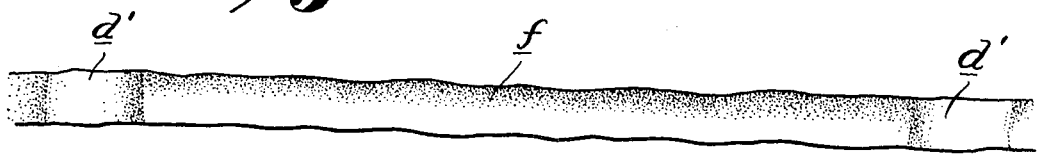
Fig. 3 is a diagrammatic plan view showing a disk formed furrow and a pair of dams formed therein.

In the diagrammatic Fig. 3 a furrow is designated at $f$ and a pair of dams are designated at $d^1$. One dam $d^1$ will be formed in each disk formed furrow $f$ upon each rotation of the shaft 10 and the dams in the several furrows will be in alternated relation.

The spacing of the dams in each furrow will be dependent upon the relative radii of the sprocket wheels 15 and 17 and such spacing will be equal to the circumference of the drill wheels W if the sprocket wheels are of the same diameter.

From the above it will be appreciated that the structure in accordance with the present invention provides spaced dams in the several disk formed furrows and due to the fact that the disks are moved in vertical directions the mulch and weeds which are essential to prevent soil blowing and erosion are left on the soil.

Having set forth my invention in accordance with a preferred structural embodiment thereof, what I claim and desire to secure by U. S. Letters Patent is:

1. An attachment for a grain drill including a frame, wheels supporting said frame, a plurality of co-axial vertically movable furrow forming disks disposed beneath and supported by the frame, a spring yieldably urging each disk to its furrowing position, manual means operatively engaged with said disks for simultaneously elevating same from said furrowing position; said attachment comprising a shaft rotatably supported by said frame, drive means between one of said wheels and said shaft, a clutch in said drive means, a plurality of arms secured to said shaft at spaced points axially thereof and in angular relation to each other, a lever corresponding to each arm pivotally secured intermediate its ends to said frame, corresponding ends of the levers being successively engageable by said arms upon rotation of said shaft, and cables connecting the other ends of said levers to the respective disks.

2. The structure according to claim 1, wherein said frame includes a rear angle bar parallel to the axes of said wheels, a second angle bar secured to said rear angle bar, a plurality of parallel laterally spaced brackets projecting rearwardly from said second angle bar, and said shaft being rotatably supported by the rear ends of said brackets.

3. A furrow damming attachment for a grain drill comprising an elongated horizontal frame including a rear bar, a wheel rotatably supported at each end of the frame, a plurality of furrow opening disks movably supported by the frame and being disposed beneath same with their axes normally parallel with the axes of said wheels, a lift rod connected with each disk, a shaft rotatably supported in the frame adjacent said rear bar, a plurality of arms having corresponding ends thereof connected to said shaft, and an operative connection between the other ends of said arms and said rods for lifting said disks upon rotation of said shaft; the said attachment comprising a second bar removably supported on said rear bar, a plurality of brackets projecting rearwardly from said second bar, a second shaft rotatably supported by the outer ends of said brackets, a plurality of laterally disposed lever bars pivotally supported intermediate their ends by said second bar, lift connections between corresponding ends of said lever bars and said disks, a plurality of spaced arms having corresponding ends thereof connected to said second shaft and the opposite ends of said spaced arms being provided with rollers engageable with the other ends of said lever bars for elevating said lift connections and therewith the corresponding disks upon rotation of said second shaft.

4. The structure according to claim 3, wherein said spaced arms are disposed in equi-angular relation about the axis of said second shaft for effecting elevation of said disks in succession and at equal time intervals.

5. The structure according to claim 3, wherein said connections between said lever bars and said disks each comprises an elongated member having one end thereof pivotally connected to the corresponding end of a lever bar, a cable clamping member adjustably connected to the other end of the member, and a cable having one end thereof connected to said clamping member and the other end thereof connected to a respective one of said lift rods.

References Cited in the file of this patent

UNITED STATES PATENTS

| 871,770 | Armitage et al. | Nov. 26, 1907 |
| 1,263,965 | Twitchel | Apr. 23, 1918 |
| 1,371,012 | Williams | Mar. 8, 1921 |
| 1,892,250 | Randolph | Dec. 27, 1932 |
| 2,172,485 | Traphagen | Sept. 12, 1939 |
| 2,192,977 | Kriegbaum | Mar. 12, 1940 |
| 2,193,065 | Erickson | Mar. 12, 1940 |

FOREIGN PATENTS

| 812,739 | Germany | Sept. 3, 1951 |